US006361008B1

(12) United States Patent
Gravenstreter

(10) Patent No.: US 6,361,008 B1
(45) Date of Patent: *Mar. 26, 2002

(54) VEHICLE CUPHOLDER

(75) Inventor: Noel P. Gravenstreter, Clarkston, MI (US)

(73) Assignee: Chrysler Corporation, Auburn Hills, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,848

(22) Filed: May 26, 1998

(51) Int. Cl.$^7$ .................................................. A47K 1/08
(52) U.S. Cl. ...................... 248/311.2; 248/313; 224/926
(58) Field of Search .............................. 248/311.2, 313, 248/316.5, 230.4; 224/926

(56) References Cited

U.S. PATENT DOCUMENTS

| 5,024,411 | A | * | 6/1991 | Elwell ...................... 248/311.2 |
| 5,054,733 | A | | 10/1991 | Shields ........................ 248/313 |
| 5,060,899 | A | | 10/1991 | Lorence et al. .......... 248/311.2 |
| 5,167,392 | A | | 12/1992 | Henricksen .............. 248/311.2 |
| 5,195,711 | A | * | 3/1993 | Miller et al. ............. 248/311.2 |
| 5,259,580 | A | * | 11/1993 | Anderson et al. ........ 248/311.2 |
| 5,284,314 | A | * | 2/1994 | Misaras et al. .......... 248/311.2 |
| 5,330,146 | A | * | 7/1994 | Spykerman .............. 248/311.2 |
| 5,603,477 | A | * | 2/1997 | Deutsch .................... 248/311.2 |
| 5,671,877 | A | * | 9/1997 | Yabuya ...................... 224/282 |
| 5,718,405 | A | * | 2/1998 | Adachi .................... 248/311.2 |
| 5,782,448 | A | * | 7/1998 | Withun et al. ........... 248/311.2 |
| 5,921,519 | A | * | 7/1999 | Dexter et al. ............. 248/311.2 |
| 5,988,579 | A | * | 11/1999 | Moner, Jr. et al. ....... 248/311.2 |
| 6,039,296 | A | * | 3/2000 | Nishina et al. .......... 248/311.2 |
| 6,059,244 | A | * | 5/2000 | Bilandzic et al. ........ 248/311.2 |
| 6,092,775 | A | * | 7/2000 | Gallant .................... 248/311.2 |
| 6,105,917 | A | * | 8/2000 | Yabuya et al. ........... 248/311.2 |

FOREIGN PATENT DOCUMENTS

| EP | 0 779 178 A1 | 12/1996 |
| FR | 2 758 298 | 1/1997 |
| JP | 7-186808 | 7/1995 |
| JP | 1111204 | * 1/1999 |

* cited by examiner

*Primary Examiner*—Anita King
*Assistant Examiner*—Kimberly Wood
(74) *Attorney, Agent, or Firm*—Mark P. Calcaterra

(57) ABSTRACT

A cupholder has a cup well to receive a container. The cup well includes a base and a wall. The wall is positioned to intersect the base. A biasing member is coupled with the wall. The biasing member is adapted to contact a container within the cup well. A positionable arm is adjustable to contact and retain different sized containers in the cup well.

3 Claims, 5 Drawing Sheets

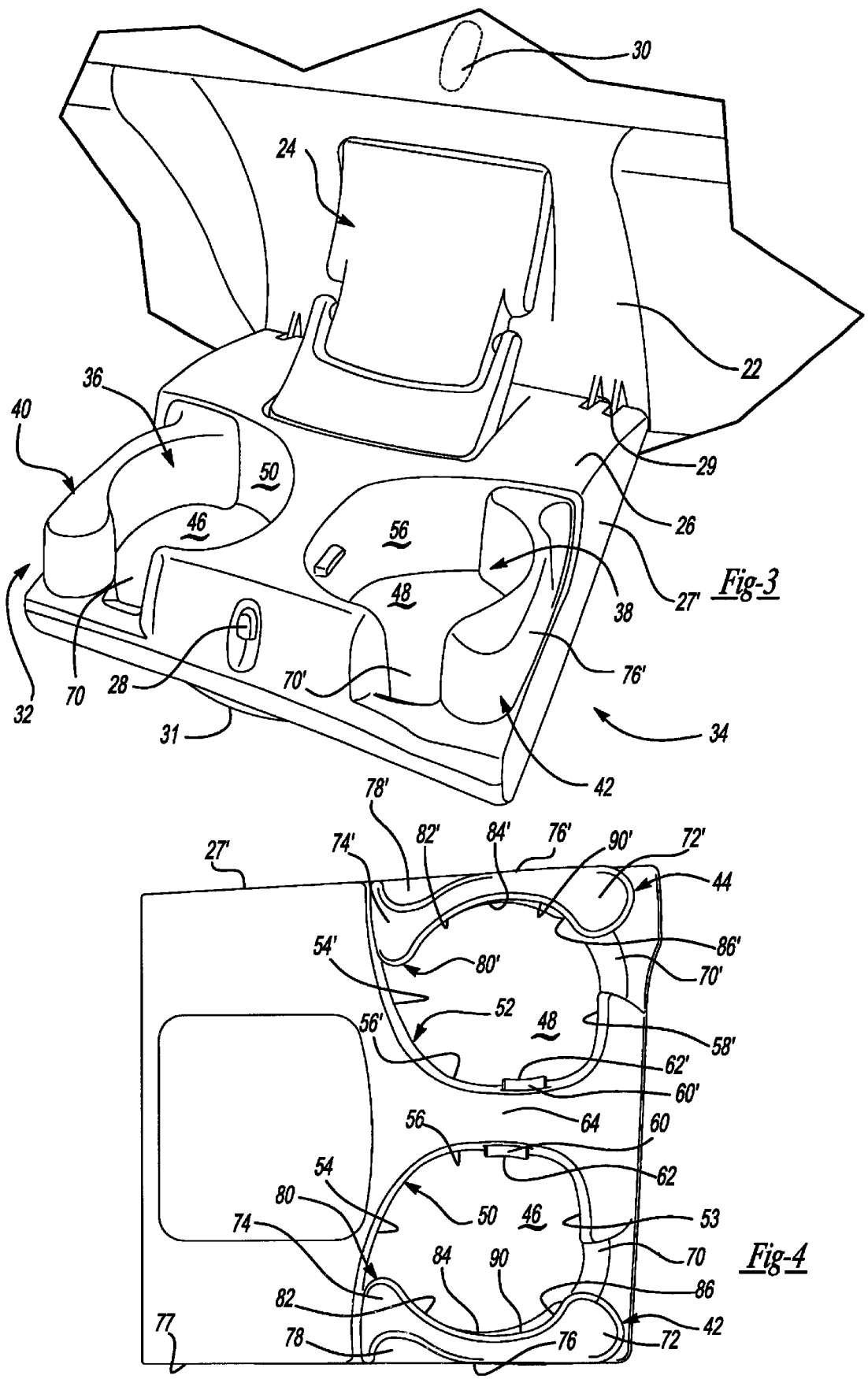

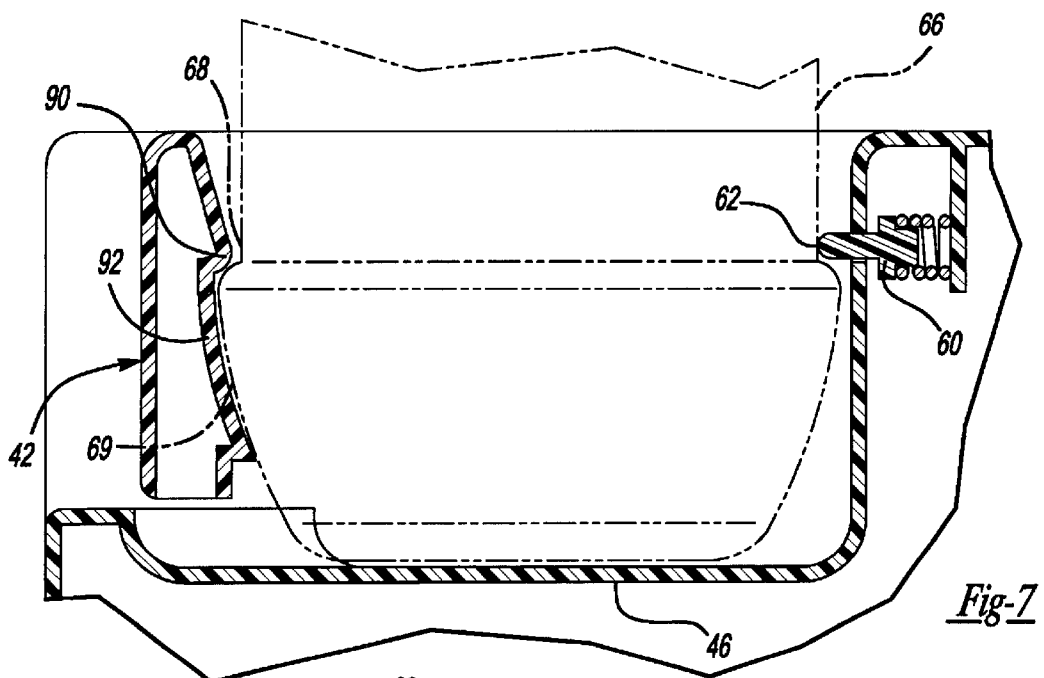
_Fig-7_
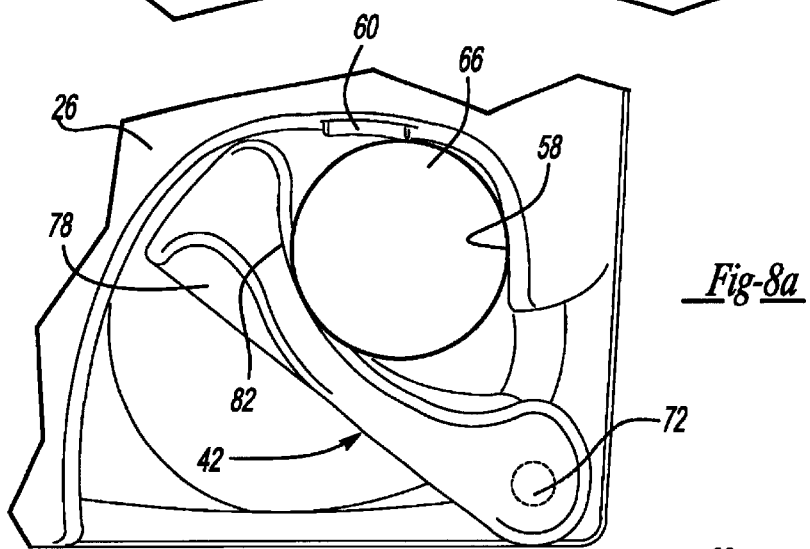
_Fig-8a_
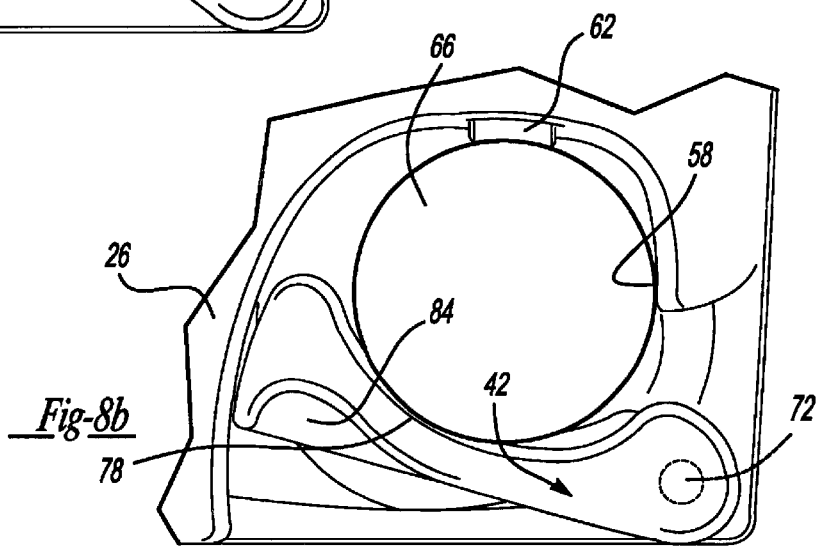
_Fig-8b_

VEHICLE CUPHOLDER

BACKGROUND AND SUMMARY OF THE INVENTION

The present invention relates to vehicles and more particularly to cupholders for retaining liquid containers, such as cups and bottles, in the interior space of a vehicle.

In a generation on the go, it is not uncommon for drivers to take beverage containers into their vehicles. Whether it be the morning coffee, a soft drink at lunch, or a water bottle, drivers and passengers are taking their beverages with them while traveling in their vehicles.

Accordingly, vehicle manufacturers, in an attempt to accommodate passengers, provide cup or drink holders in the vehicle interior space. The cup or drink holders range from simple molded cylinders to complex, squeezing fingers. While some of these cupholders are capable of accommodating more than one size container, they fall short of accommodating larger containers.

Accordingly, it is an object of the present invention to overcome the shortcomings of prior art cupholders. The present invention provides the art with a cupholder which is adjustable to contact and retain numerous sizes of containers in the cupholder. The present invention provides a cupholder which applies at least three forces onto the container to retain it in the cupholder. The present invention also provides a cupholder which retains liquid which may accumulate through spillage or condensation. The cupholder enables easy cleanout. Further, the cupholder of the present invention provides members to retain containers, such as soft drink bottles which have recesses near their base, in a firm upright position.

Additional objects and advantages of the invention will become apparent from the detailed description of the preferred embodiment, the appended claims and accompanying drawings, or may be learned by practice of the invention.

BRIEF DESCRIPTION OF THE DRAWINGS

FIG. 3 is an enlarged perspective view of the cupholder according to the present invention.

FIG. 4 is a top plan view of the cupholder of FIG. 3.

FIG. 7 is a view like FIG. 6 with a bottle retained in the cupholder.

FIGS. 8a, 8b and 8c are top plan views of the cupholder with a container, of different size, retained within the cupholder.

DETAILED DESCRIPTION OF THE PREFERRED EMBODIMENTS

Figure 1:
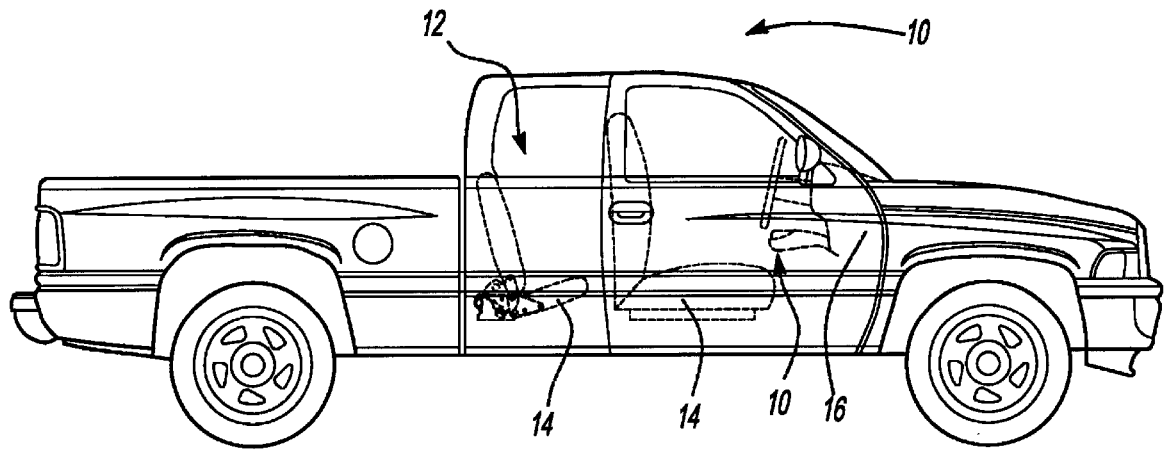
FIG. 1 is a side elevation view of a vehicle with cupholder, illustrated in phantom, according to the present invention.
Figure 2:
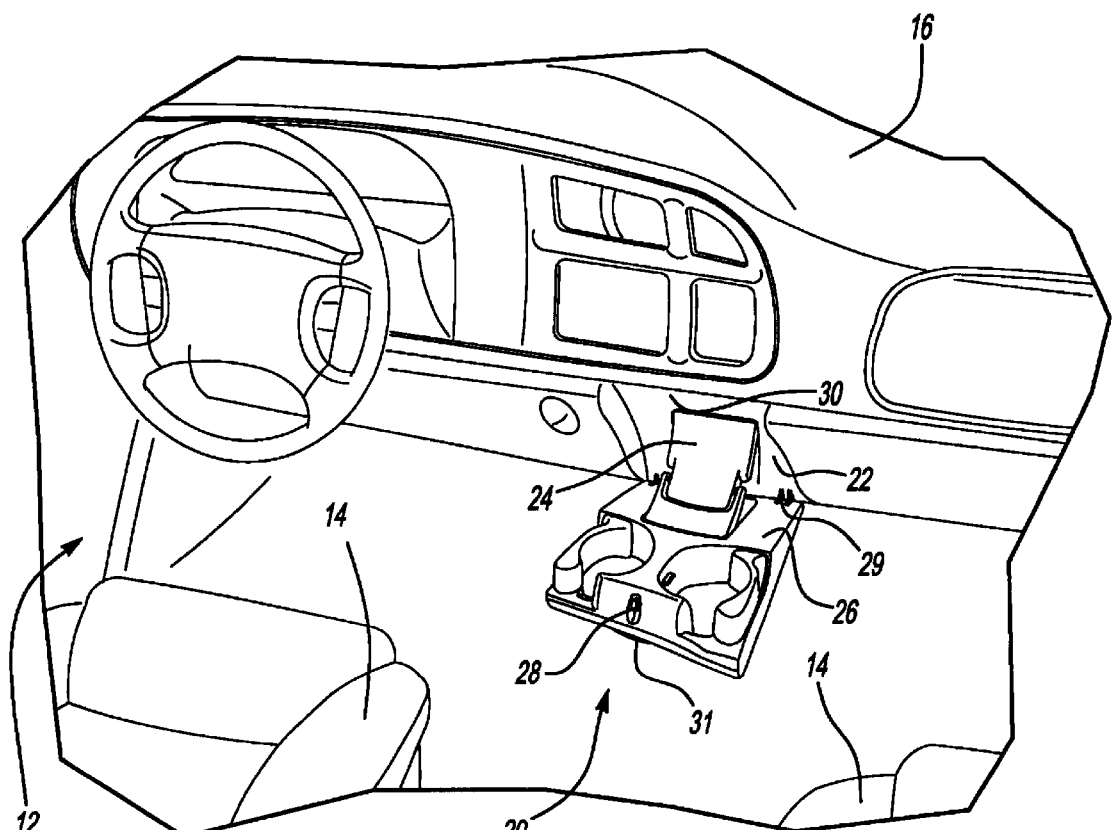
FIG. 2 is a perspective view of the present invention in a vehicle interior space.
Figure 5:
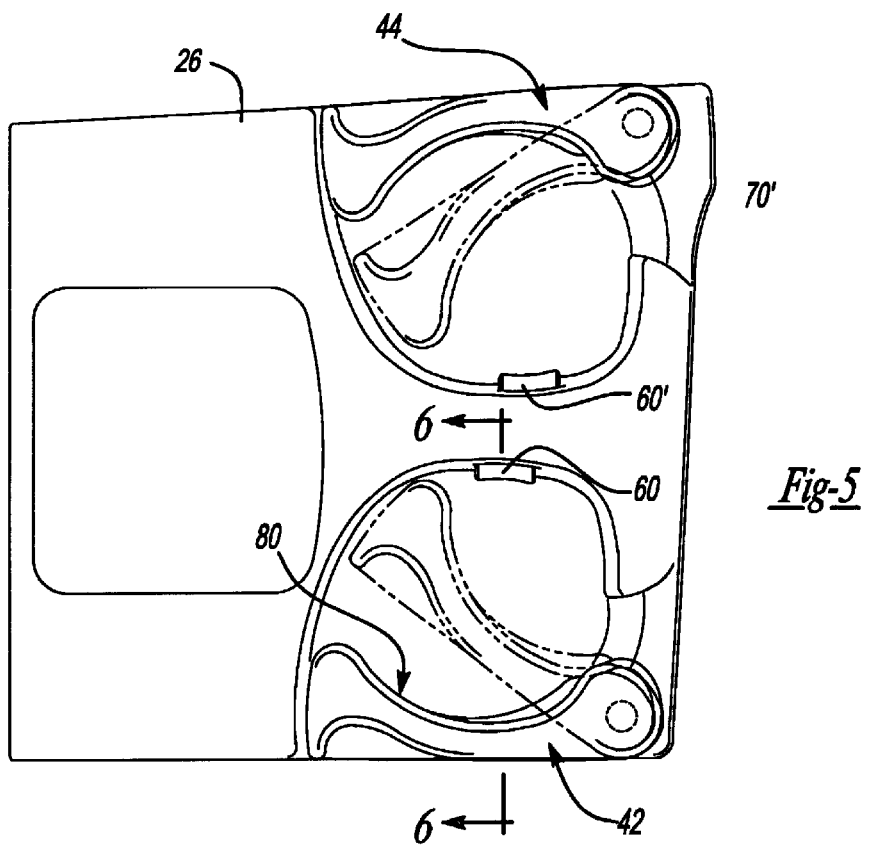
FIG. 5 is a plan view like that of FIG. 4 with the arm illustrated in phantom in several positions.

Turning to the figures, particularly FIG. 1, a vehicle is illustrated and designated with the reference numeral 10. The vehicle 10 includes an interior space 12. The interior space 12 has seats 14 as well as a dashboard 16, FIG. 2. The dashboard 16 includes a cupholder assembly 20. The cupholder assembly 20 includes a securement member 22 which is secured to the dashboard 16. A link hinge assembly 24 connects the securement member 22 with the cupholder member 26 at a main hinge 29. In FIGS. 1–3, the cupholder member 26 is shown in a down position. The cupholder member 26 may be pushed upward wherein a latch 28 catches the securement member catch or aperture 30. In the retracted position, the cupholder member 26 is flush with the dashboard 16. Handle 31 is actuated to release the latch 28 from the catch 30.

The cupholder member 26 includes a pair of cupholders 32 and 34. The cupholders 32 and 34 are mirror images of one another. The cupholders 32 and 34 each include a cup wells 36 and 38 and movable arms 40 and 42.

The cup wells 36 and 38 include a base 46 and 48 and a continuous wall 50 and 52 extending from the base 46, 48. The base 46, 48 and wall 50, 52 enable fluid to be caught and retained in the cup well 36, 38. The wall 50, 52 extends substantially perpendicular from the base 46, 48 and includes a first arcuate portion 54, 54', a substantially planar portion 56, 56' and a second arcuate portion 58, 58'. The first arcuate portion 56, 56' extends from the side 27, 27' of the cupholder member 26 to the substantially planar member 56, 56'. The first arcuate portion 54 provides a path to enable the arm 40, 42 to pivot to close upon a container 66 within the cup well 36, 38. The planar wall portion 56, 56' includes a biasing member 60, 60'. The biasing member 60, 60' moves inward into the partition 64 between the pair of cup wells 36, 38. The biasing member 60, 60' includes an arcuate portion 62, 62' which biases against a container in the cup well 36, 38 creating a retention force on the container. Thus, as a container 66 is positioned in the cup well 36, 38 and the arm 40, 42 contacts the container, the biasing member 60, 60' applies a force onto the container.

The biasing member 60, 60' is positioned a desired distance from the base 46, 48 to mate in a recess 68 in certain types of containers 66, such as plastic soda bottles as illustrated in FIG. 7. The biasing member 60, 60' is positioned at about 38 millimeters from the base 46, 48 which enables the biasing member 60, 60' to project into the recess 68 to retain the container 66 within the cup well 38 as illustrated in FIG. 7.

Figure 8C:
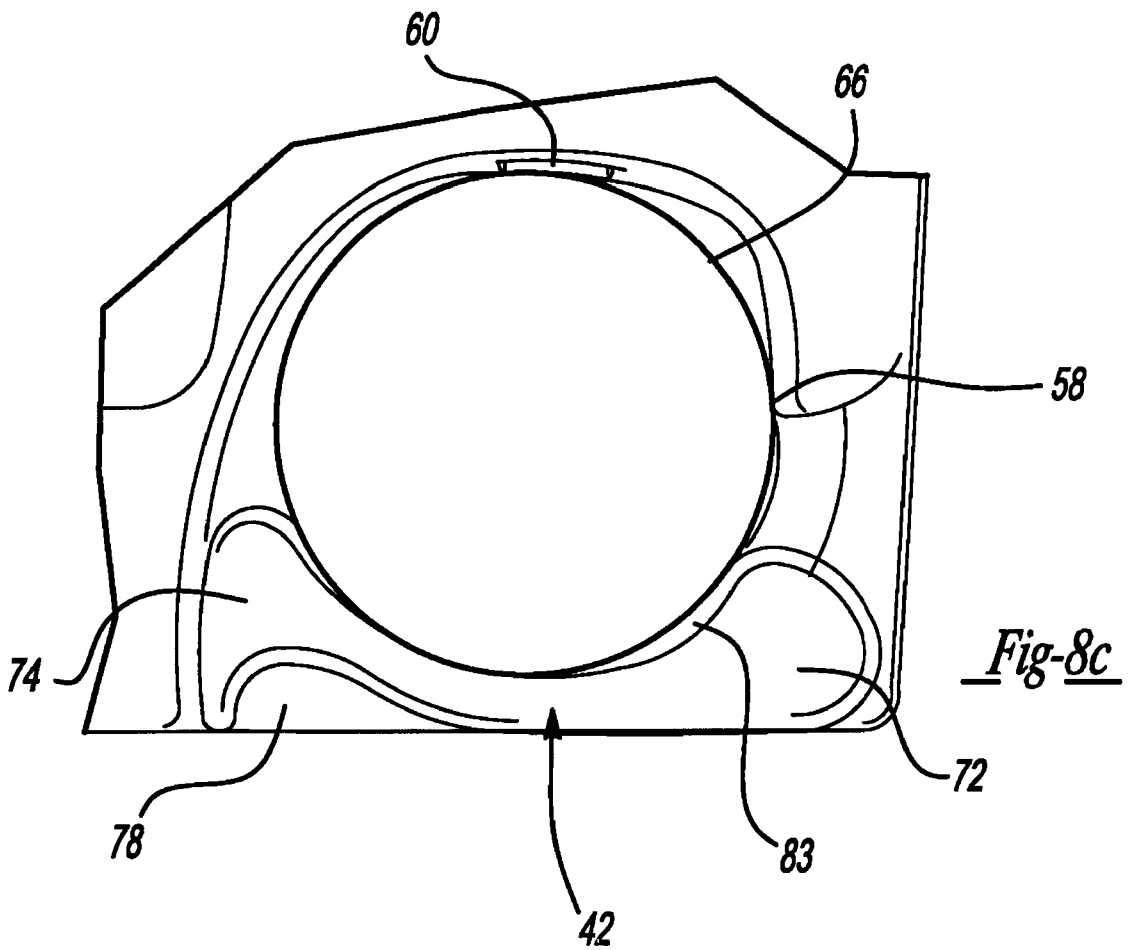

The second arcuate portion 58, 58' extends towards the arm 40, 42 and is spaced a desired distance from the arm forming a mug handle gap 70, 70'. The gap 70, 70' enables a handle on a mug (not shown) to project out of the cup well 36, 38 and be easily grasped by the user. The arcuate portion 58 has a desired radius so that as the container 66 is positioned in the cup well, the second arcuate portion 58 contacts the container 66 to exert a retention force on the container 66. As can be seen in FIGS. 8a–8c, as the container 66 is retained in the cup well 36 by the arm 40, 42, biasing member 60, 60' and second arcuate portion 58, 58', these three members exert a retention force on the container to maintain the container 66 in the cupholder 32, 34.

The arms 42 and 44 are elongated having a pivot end 72, 72' secured to the cupholder member 26 and a free end 74, 74' which moves into the cup well 36, 38. The arm 42, 44 has an external surface 76, 76' aligned with the side 27, 27' of the cupholder member 26 which includes an indention 78, 78' to receive a finger from the user to enable the arm 42, 44 to be moved into the cup well 36, 38.

The arm 42, 44 also include an interior surface 80, 80' opposing the cup well wall 50, 52. The interior surface 80, 80' includes first 82, 82', second 84, 84' and third 86, 86' arcuate portions. The arcuate portions 82, 84, 86, 82', 84', 86' each have a desired radius. The first arcuate portion 82, 82' is designed to contact smaller containers 66 when they are positioned within the cup well 36 as seen in FIG. 8a. Containers 66 such as seven ounce cups or baby bottles are contacted by the first arcuate portion 82, 82'. Here, the first arcuate portion 82, 82' along with the biasing member 60, 60' and cup well wall second arcuate portion 58, 58' provide a three point forced contact on the container 66.

The second arm arcuate portion 84, 84' applies a force on medium size containers 66 such as sixteen to twenty ounce cups or bottles as seen in FIG. 8b. Here, the second portion 84, 84' along with the biasing member 60, 60' and the cup well wall portion second arcuate portion 58, 58' apply force onto the container 66.

The third arm arcuate portion 86, 86' adjacent the pivot end 72, 72' of the arm 42, 44 applies a force onto large containers such as forty-four ounce cups as seen in FIG. 8c. Here, the third arcuate portion 86, 86', as well as the second arcuate portion 84, 84', along with the biasing member 60, 60' and the cup well wall second arcuate portion 58, 58' exert a three point force onto large containers. Thus, for large containers, a four point force is applied and a three point force is applied on smaller containers.

Figure 6:
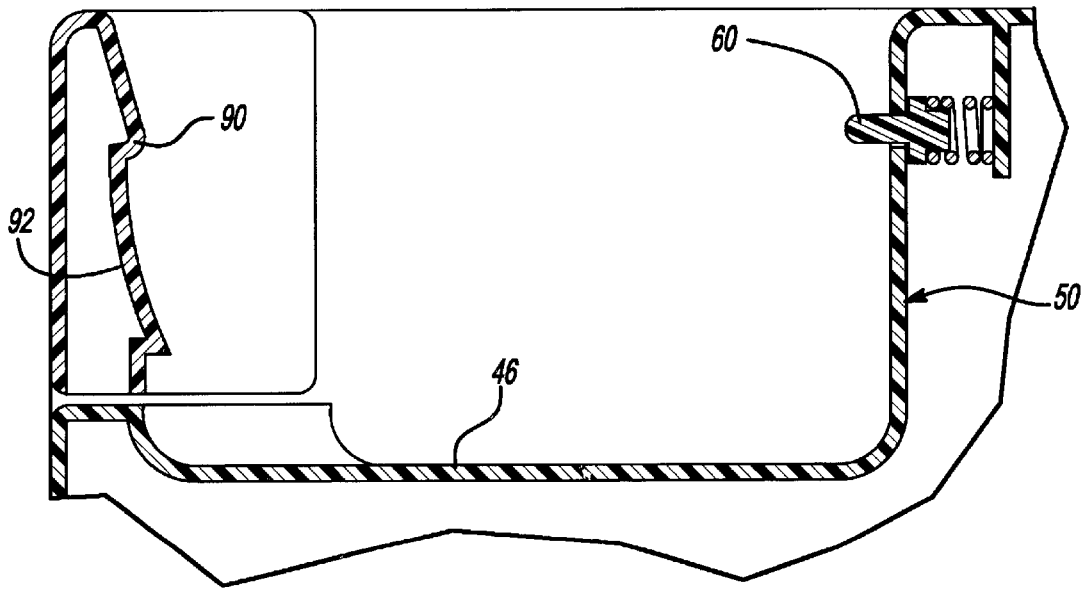
FIG. 6 is a cross-section view through FIG. 5 along line 6—6 thereof.

The arm interior surface 80, 80' includes an undercut 90, 90' positioned a desired distance above the cup well base 46, 48. The undercut 90, 90' is such that it contacts the recess 68 in the container 66 along with the biasing member 60, 60' to retain the bottle container 66 within the cup well 38 as illustrated in FIG. 6. Here, the undercut 90, 90' as well as the biasing member 60, 60' are above the bottom portion 69 of the bottle container 66 securing the bottom 69 and the bottle container within the cup well 36, 38. Also, the bottom portion 92, 92' of the arm interior surface 80, 80' has a configuration adapted to contact the base 69 of the bottle container 66. Thus, the lower portion 92, 92' is angled inward to conform to the base 69 of the container.

The arm 42, 44 includes a detent pivot, of said force, so that the arm 42, 44 can be pivoted about the pivot end to move inward on the cup well 38 to retain different size of containers 66 within the cup well 38 as seen in FIGS. 7a–7c. As the arm 42, 44 is pivoted inward, the arm 42, 44 contacts preset detent positions until the free end 74, 74' of the arm 42, 44 contacts the cup well wall 50, 52. As the arm 42, 44 moves from detent position to detent position, the arm 42, 44 is able to flex within its detent position without moving out of the detent position. Thus, as a container 66 is inserted between the arm 42, 44 biasing member 60, 60' and second arcuate wall 58, 58', a socket effect is created to retain the container 66 within the cup well 36, 38.

Thus, the arm 42, 44 is pivoted inward to contact varying sized containers 66. As the arm 42, 44 is moved inward, depending upon the size of the container 66, one of the arcuate portions 82, 84, 86, 82', 84', 86' will contact the container 66 to maintain the container within the cup well 36, 38 as seen in FIGS. 7 and 8a–8c. The container 66 will also be contacted by the biasing member 60, 60' as well as the second wall arcuate portion 58, 58'. Thus, the present invention provides a cup holder which is adjustable applies three points of force onto containers 66 positioned within the cup well 36, 38.

While the above detailed description describes the preferred embodiment of the present invention, the invention is susceptible to modification, variation and alteration without deviating from the scope and fair meaning of the subjoined claims.

What is claimed is:

1. A vehicle cup holder assembly comprising:

first and second cup holders positioned in side-by-side relation to one another, said first cup holder including a first cup well having a first base and a first side wall intersecting said first base and adapted to receive a first beverage container, a first biasing member carried by said first wall and spring-urged inwardly relative to said first cup well to contact one side of the first beverage container when the first beverage container is in said first cup well, a first pivoted arm movable inwardly and outwardly relative to said first cup well to a plurality of preset detent positions to contact an opposite side of the first beverage container when the first beverage container is in said first cup well, said second cup holder including a second cup well having a second base and a second side wall intersecting said second base and adapted to receive a second beverage container, a second biasing member carried by said second side wall and spring urged inwardly relative to said second cup well to contact one side of the second beverage container when the second beverage container is in said second cup well, and a second pivoted arm movable inwardly and outwardly relative to said second cup well to a plurality of preset detent positions to contact an opposite side of the second beverage container when the second beverage container is in said second cup well, said first and second arms being manually movable independently of one another.

2. A vehicle cup holder assembly as defined in claim 1, wherein said first arm has two arcuate portions to contact two different sizes of the first container, and said second arm has two arcuate portions to contact two different sizes of the second container.

3. A vehicle cup holder assembly as defined in claim 2, wherein said first arm has a first undercut container-retaining portion a predetermined distance above said first base, and has a first container-bottom-receiving portion below said first undercut container-receiving portion, and said second arm has a second undercut container-retaining portion a predetermined distance above said second base, and has a second container-bottom-receiving portion below said second undercut container-receiving portion.

* * * * *